United States Patent
Chuong et al.

(10) Patent No.: US 9,879,556 B2
(45) Date of Patent: Jan. 30, 2018

(54) COOLED FINGER SEAL

(71) Applicant: United Technologies Corporation, Hartford, CT (US)

(72) Inventors: Conway Chuong, Manchester, CT (US); Jeffrey J. Lienau, Wethersfield, CT (US); William Yeager, Jupiter, FL (US)

(73) Assignee: United Technologies Corporation, Farmington, CT (US)

( * ) Notice: Subject to any disclaimer, the term of this patent is extended or adjusted under 35 U.S.C. 154(b) by 537 days.

(21) Appl. No.: 14/679,615

(22) Filed: Apr. 6, 2015

(65) Prior Publication Data

US 2015/0354386 A1  Dec. 10, 2015

Related U.S. Application Data (60) Provisional application No. 61/978,497, filed on Apr. 11, 2014.

(51) Int. Cl.

| | |
|---|---|
| *F01D 11/00* | (2006.01) |
| *F01D 25/30* | (2006.01) |
| *F01D 25/24* | (2006.01) |
| *F01D 25/12* | (2006.01) |
| *F16J 15/08* | (2006.01) |

(Continued)

(52) U.S. Cl.
CPC ............ *F01D 11/005* (2013.01); *F01D 25/12* (2013.01); *F01D 25/162* (2013.01); *F01D 25/24* (2013.01);

(Continued)

(58) Field of Classification Search
CPC ...... F01D 11/005; F01D 25/12; F01D 25/162; F01D 25/246; F01D 25/30; F01D 11/001;
(Continued)

(56) References Cited

U.S. PATENT DOCUMENTS

| | | |
|---|---|---|
| 4,114,248 A | 9/1978 | Smith et al. |
| 4,645,217 A | 2/1987 | Honeycutt, Jr. et al. |

(Continued)

FOREIGN PATENT DOCUMENTS

| | | |
|---|---|---|
| EP | 1323901 A2 | 7/2003 |
| EP | 1801359 A2 | 6/2007 |
| WO | WO2014/105528 A1 | 7/2014 |

OTHER PUBLICATIONS

Extended European Search Report for EP Application No. 15163427.6, dated Dec. 8, 2015, 10 pages.

*Primary Examiner* — Dwayne J White
*Assistant Examiner* — Sang K Kim
(74) *Attorney, Agent, or Firm* — Kinney & Lange, P.A.

(57) ABSTRACT

An air seal for a gas turbine engine platform comprises a flow path platform, a seal retention ring, a finger seal. The seal retention ring is situated radially adjacent the flow path platform. The finger seal is retained by the seal retention ring between the flow path platform and the seal retention ring. The finger seal comprises a first ply with first keyhole slots, a second ply with second keyhole slots circumferentially offset relative to the first keyhole slots, and a foil layer. The foil layer is disposed between the first and second plies. The finger seal has a series of cooling holes in the outer circumferential segment to cool the outer diameter of the seal. In addition, leakage between the finger seal and the flow path platform cools the inner diameter of the seal.

10 Claims, 5 Drawing Sheets

(51) Int. Cl.
*F01D 25/16* (2006.01)
*F02C 7/28* (2006.01)

(52) U.S. Cl.
CPC ........... *F01D 25/246* (2013.01); *F01D 25/30* (2013.01); *F02C 7/28* (2013.01); *F16J 15/0887* (2013.01); *F05D 2220/32* (2013.01); *F05D 2240/55* (2013.01); *F05D 2240/57* (2013.01); *F05D 2260/202* (2013.01)

(58) Field of Classification Search
CPC ........ F01D 11/003; F01D 11/006; F02C 7/28; F16J 15/0887; F05D 2220/32; F05D 2240/55; F05D 2240/57; F05D 2260/202
See application file for complete search history.

(56) References Cited

U.S. PATENT DOCUMENTS

| | | | | |
|---|---|---|---|---|
| 5,560,198 A * | 10/1996 | Brewer | ................... | F02K 1/805 277/628 |
| 7,527,469 B2 * | 5/2009 | Zborovsky | .............. | F01D 9/041 277/412 |
| 7,798,765 B2 | 9/2010 | Snyder et al. | | |
| 8,069,648 B2 * | 12/2011 | Snyder | .................... | F01D 25/30 60/226.1 |
| 8,695,351 B2 | 4/2014 | Chen et al. | | |
| 8,920,112 B2 * | 12/2014 | Ring | ....................... | F01D 25/04 415/119 |
| 8,985,592 B2 * | 3/2015 | Green | ..................... | F01D 9/023 277/637 |
| 9,366,444 B2 * | 6/2016 | Salunkhe | ................ | F01D 9/023 |
| 9,435,266 B2 * | 9/2016 | Sutterfield | .............. | F02K 1/805 |
| 2013/0192260 A1 | 8/2013 | Mayer et al. | | |
| 2013/0270777 A1 | 10/2013 | Clouse | | |
| 2014/0183825 A1 | 7/2014 | Chuong et al. | | |
| 2014/0248126 A1 | 9/2014 | Chuong et al. | | |
| 2014/0248128 A1 | 9/2014 | Budnick et al. | | |
| 2014/0286763 A1 * | 9/2014 | Munshi | ..................... | F02C 7/12 415/178 |

\* cited by examiner

COOLED FINGER SEAL

CROSS-REFERENCE TO RELATED APPLICATION(S)

This application claims priority to U.S. Provisional Application No. 61/978,497, filed on Apr. 11, 2014, and entitled "COOLED FINGER SEAL", the disclosure of which is incorporated by reference in its entirety.

BACKGROUND

The present invention relates generally to gas turbine engine endwall features, and more specifically to endwall configurations that reduce main gas path flow ingestion into secondary, lower-temperature regions of the gas turbine engine.

Gas turbine engines operate according to a continuous-flow, Brayton cycle. A compressor section pressurizes an ambient air stream, fuel is added and the mixture is burned in a central combustor section. The combustion products expand through a turbine section where bladed rotors convert thermal energy from the combustion products into mechanical energy for rotating one or more centrally mounted shafts. The shafts, in turn, drive the forward compressor section, thus continuing the cycle. Gas turbine engines are compact and powerful power plants, making them suitable for powering aircraft, heavy equipment, ships and electrical power generators. In power generating applications, the combustion products can also drive a separate power turbine attached to an electrical generator.

Seals are required in many locations within a gas turbine engine to regulate air flow to various portions of the engine. One function of air seals in gas turbine engines is to limit ingestion of hot "core" or "main" gas path airflow into secondary cavities and passages. Secondary airflow system components are often constructed to tolerate lower maximum temperatures than core gas path components. Excessive ingestion of main gas path airflow can result in undesirable heating of engine components, reducing part lifetimes or necessitating that parts be constructed of expensive, high temperature-capable materials.

SUMMARY

The present invention relates to an air seal for a gas turbine engine platform. The air seal comprises a flow path platform, a seal retention ring, and a finger seal. The seal retention ring is situated radially adjacent the flow path platform. The finger seal is retained by the seal retention ring between the flow path platform and the seal retention ring. The finger seal comprises a first ply with first keyhole slots, a second ply with second keyhole slots circumferentially offset relative to the first keyhole slots, and a foil layer. The foil layer is disposed between the first and second plies.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

A finger seal for a gas turbine engine can be disposed at an aft outer diameter of a turbine exhaust case airflow platform to reduce flow leakage between a flow path fairing and a structural frame. The finger seal can include a flexible foil layer disposed between first and second sheet metal plies. The finger seal has substantially radial cooling holes to allow directed airflow through and past the finger seal so as to discourage flow into a radially outer annular cavity, and protect a face of the finger seal from hot combustion gasses.

Figure 1:
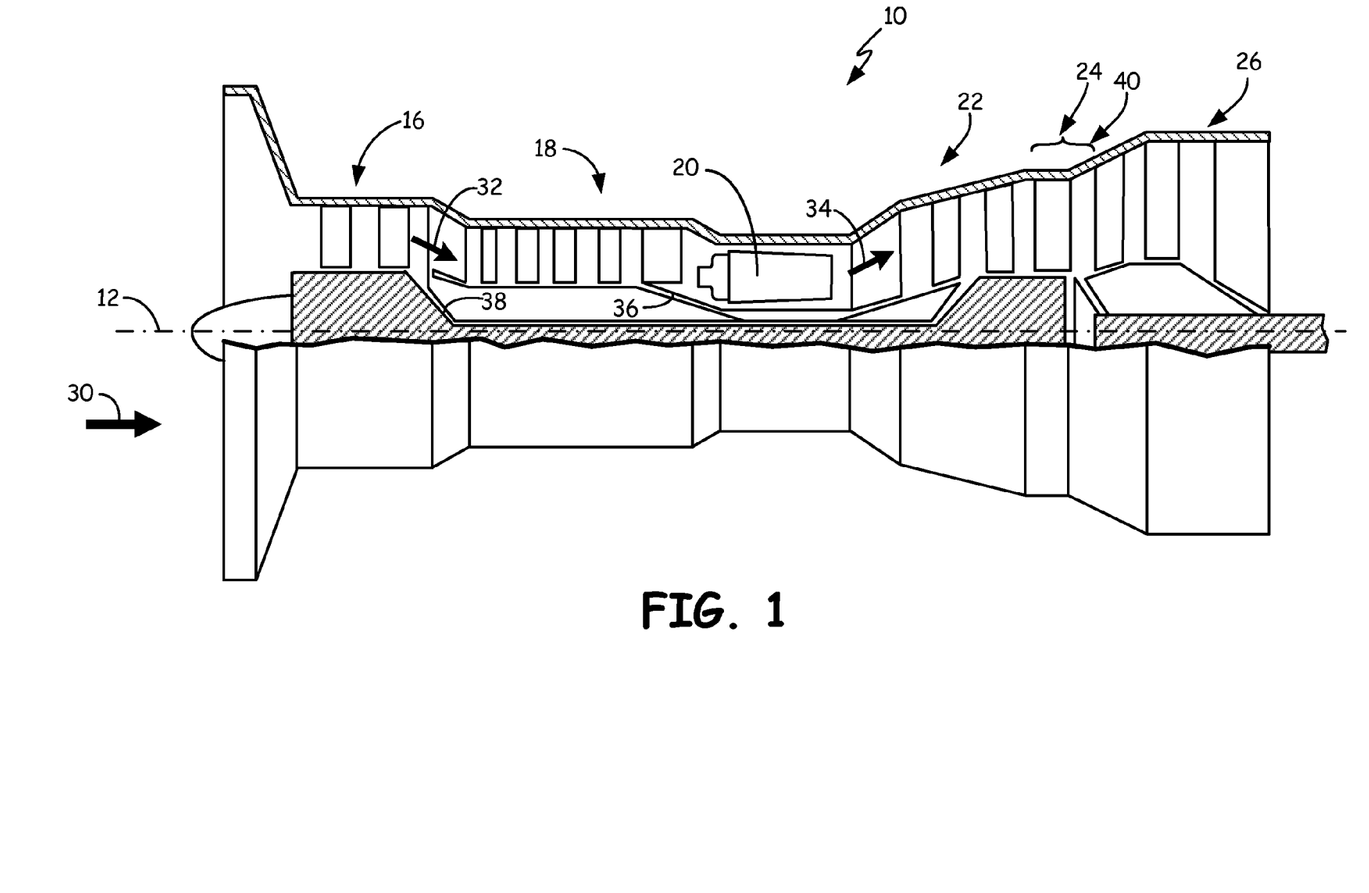
FIG. 1 is a simplified cross-sectional view of a gas turbine engine.

FIG. 1 is a simplified cross-sectional view of gas turbine engine 10, which is circumferentially disposed about a central, longitudinal axis or axial engine centerline axis 12. Gas turbine engine 10 includes, in series order from front to rear, low and high pressure compressor sections 16 and 18, a central combustor section 20 and high and low pressure turbine sections 22 and 24. In some examples, power turbine 26 is disposed aft of the low pressure turbine 24. Although illustrated with reference to an industrial gas turbine engine, this application also extends to aero engines with a fan or gear driven fan, and engines with more or fewer sections than illustrated.

As is well known in the art of gas turbines, incoming ambient air 30 becomes pressurized air 32 in the compressors 16 and 18. Fuel mixes with the pressurized air 32 in the combustor section 20, where it is burned to produce combustion gasses 34 that expand as they flow through turbine sections 22, 24 and power turbine 26. Turbine sections 22 and 24 drive high and low pressure rotor shafts 36 and 38 respectively, which rotate in response to the combustion products and thus the attached compressor sections 18, 16. Power turbine 26 may, for example, drive an electrical generator, pump, gearbox, or other accessory (not shown). In the illustrated embodiment, turbine section 24 meets power turbine 26 at joint 40.

It is understood that FIG. 1 provides a basic understanding and overview of the various sections and the basic operation of an industrial gas turbine engine. The illustrated embodiment is provided merely by way of example and not limitation. Numerous alternative configurations are possible, which may include additional components not specifically shorn or omit certain illustrated components. It will become apparent to those skilled in the art that the present application is applicable to all types of gas turbine engines, including those with aerospace applications.

Figure 2:
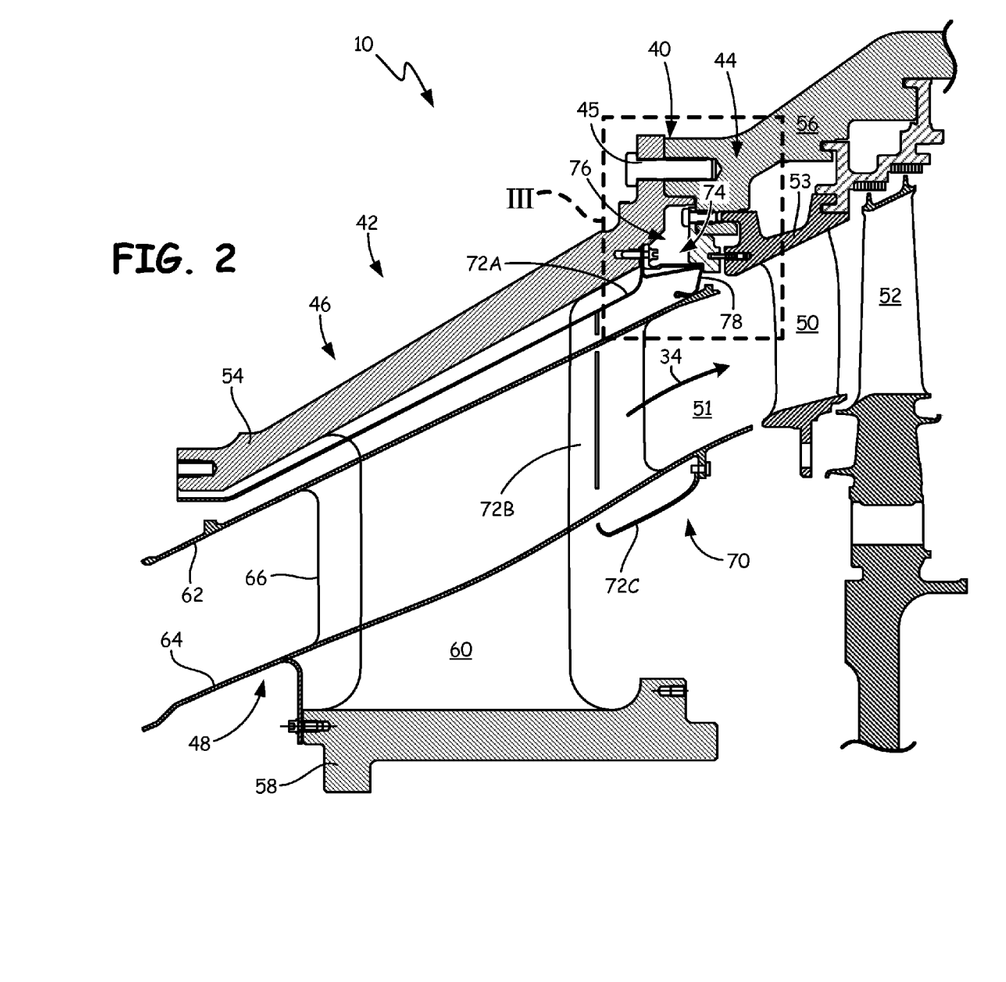
FIG. 2 is a cross-sectional view of a turbine exhaust case region of the gas turbine engine of FIG. 1.

FIG. 2 shows gas turbine 10 near joint 40, including combustion gasses 34, first turbine module 42, second turbine module 44, module fasteners 45, frame 46, fairing assembly 48, stator vane 50, main gas flow path 51, rotor blade 52, stator outer diameter (OD) platform 53, first outer casing 54, second outer casing 56, frame inner hub 58, frame strut 60, fairing outer platform 62, fairing inner platform 64, fairing strut liners 66, heat shield assembly 70, heat shield elements 72A, 72B, 72C, annular cavity 74, and seal assembly 76 with finger seal 78.

In some embodiments, first module 42 can be a stage or region of turbine section 24, and second module 44 is a stage or region of power turbine 26. In alternative embodiments, first and second modules 42 and 44 can be other adjacent sections or stages of gas turbine engine 10. First module 42 can, for example, be a turbine exhaust case (TEC) assembly connecting a low pressure turbine (e.g. turbine section 24) to power turbine 26. First module 42 and second module 44 are interconnected by module fasteners 45, which can for instance be bolts, screws, or pins. Although first module 42 and second module 44 are depicted as having adjacent stationary vane sections, some embodiments of the present invention can involve adjacent stationary and rotating components. Although first module 44 and second module 44 are referred to hereinafter as a TEC and power turbine, respectively, it will be appreciated that first module 42 can comprise any suitable module of gas turbine engine 10 such as compressor sections 16, 18 or turbine sections 22, 24. Second module 44 can similarly be a module secured downstream of first module 42. Gas turbine engines typically are divided into modules for ease of assembly and design. Modules such as first module 42 and second module 44 are assembled separately, and then combined together at the engine level to create the various engine portions illustrated for gas turbine engine 10 of FIG. 1.

Among other components, first module 42 includes frame 46 and fairing assembly 48. Second module 44 additionally houses components such as stator vane 50 and rotor blade 52. First module 42 is connected to second module 44 such that modules 42 and 44 abut along respective first and second outer casings 54, 56. First module 42 and second module 44 are connected such that vane 50 and blade 52 are disposed downstream of frame 46 and fairing 48 with respect to gas flow along main engine gas flow path 51.

In this example embodiment, frame 46 includes outer casing section 54 and inner hub 58, with a plurality of circumferentially distributed struts 60 extending radially therebetween. Only one strut 60 is shown in FIG. 2. When assembled, fairing assembly 48 surrounds frame 46 to define main gas flow path 51. In this example, fairing assembly 48 includes individual fairing elements such as fairing outer platform 62, fairing inner platform 64, and strut liners 66. Fairing outer and inner platforms 62 and 64, respectively, each have a generally frustoconical shape conforming to the shape of outer case 58. Fairing inner platform 64 is spaced from fairing outer platform 62 by strut liners 66. Strut liners 66 are adapted to be disposed around struts 60, extending radially between inner radial platform 62 and outer radial platform 60. Fairing outer platform 62, fairing inner platform 54, and strut liners 66 can, for example, be formed of sheets of high temperature-capable material such as nickel- or cobalt-based superalloys, and in some embodiments can be formed of multiple welded-together circumferential segments or sections.

Fairing assembly 48 prevents direct contact of main gas path flow with frame 46. To provide further thermal control, heat shield assembly 70 can be disposed in a line of sight between fairing assembly 48 and frame 46. Heat shield elements 72A, 72B, 72C are secured to various parts of first module 42 so as to reduce heating of frame 46 caused by thermal radiation emitted from fairing assembly 48.

Figure 3:
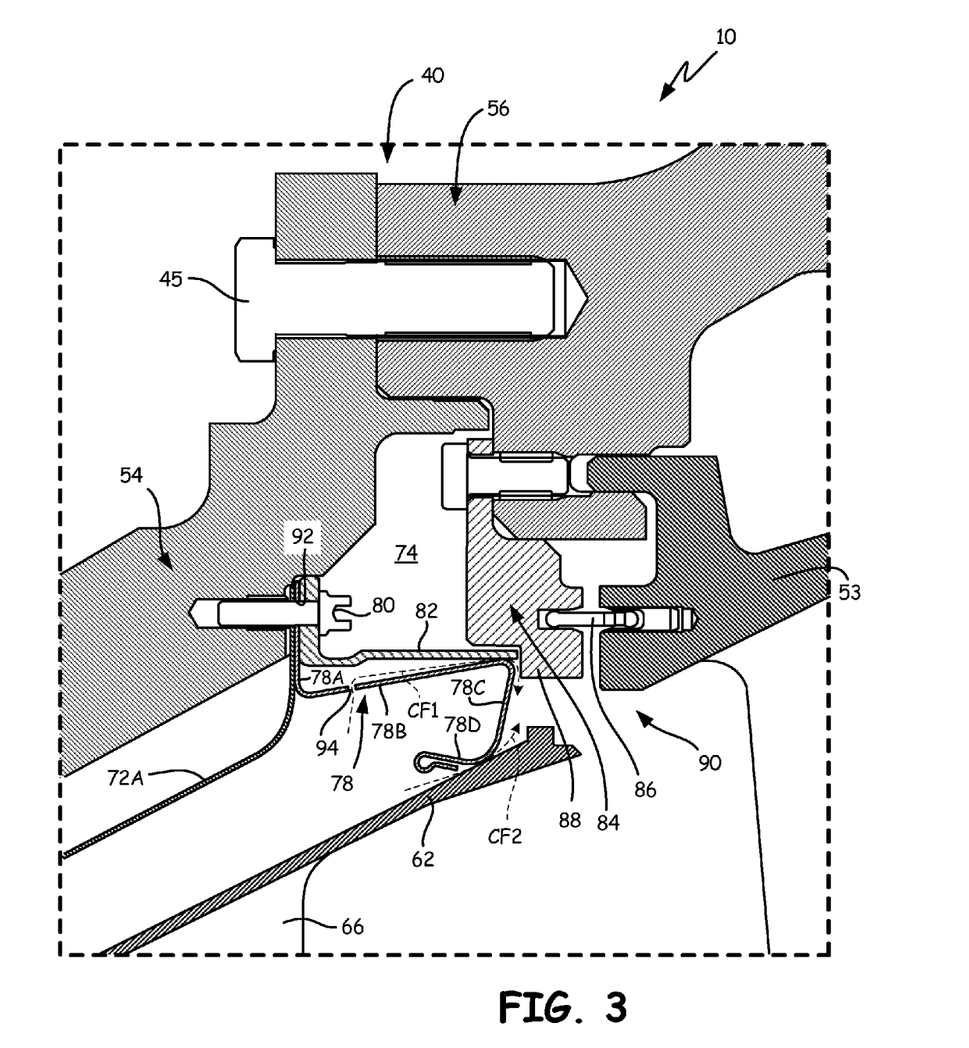
FIG. 3 is a close-up cross-sectional view of an outer diameter air seal of the turbine exhaust case region of FIG. 2.
Figure 4:
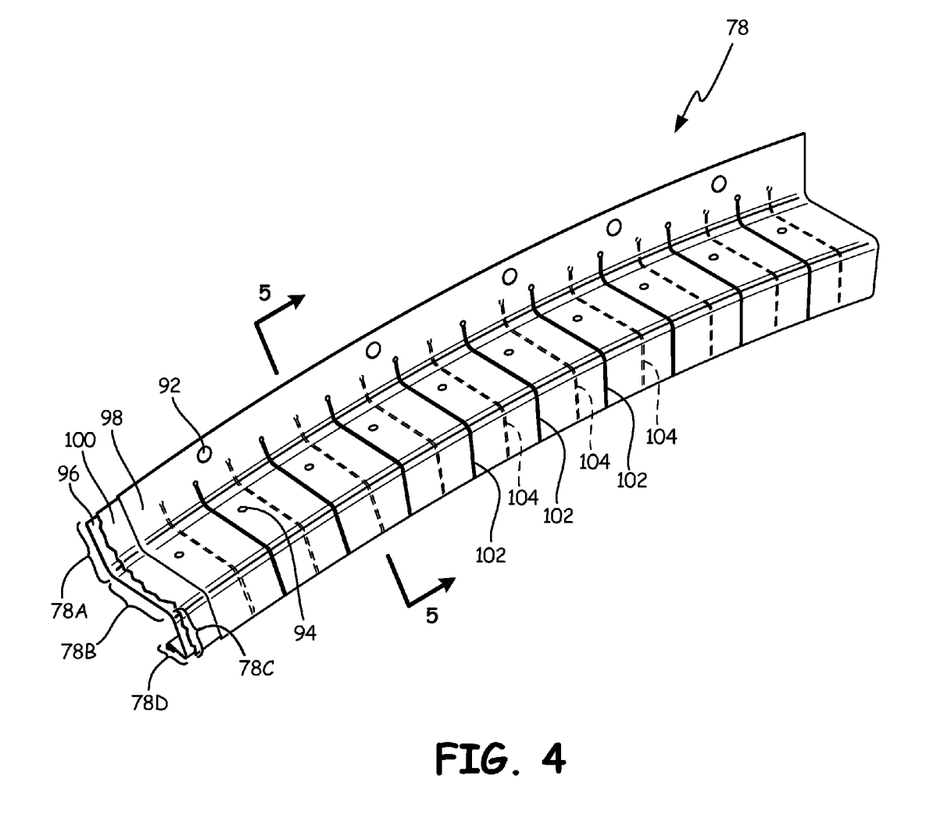
FIG. 4 is a perspective view of a finger seal of the outer diameter air seal of FIG. 3.
Figure 5:
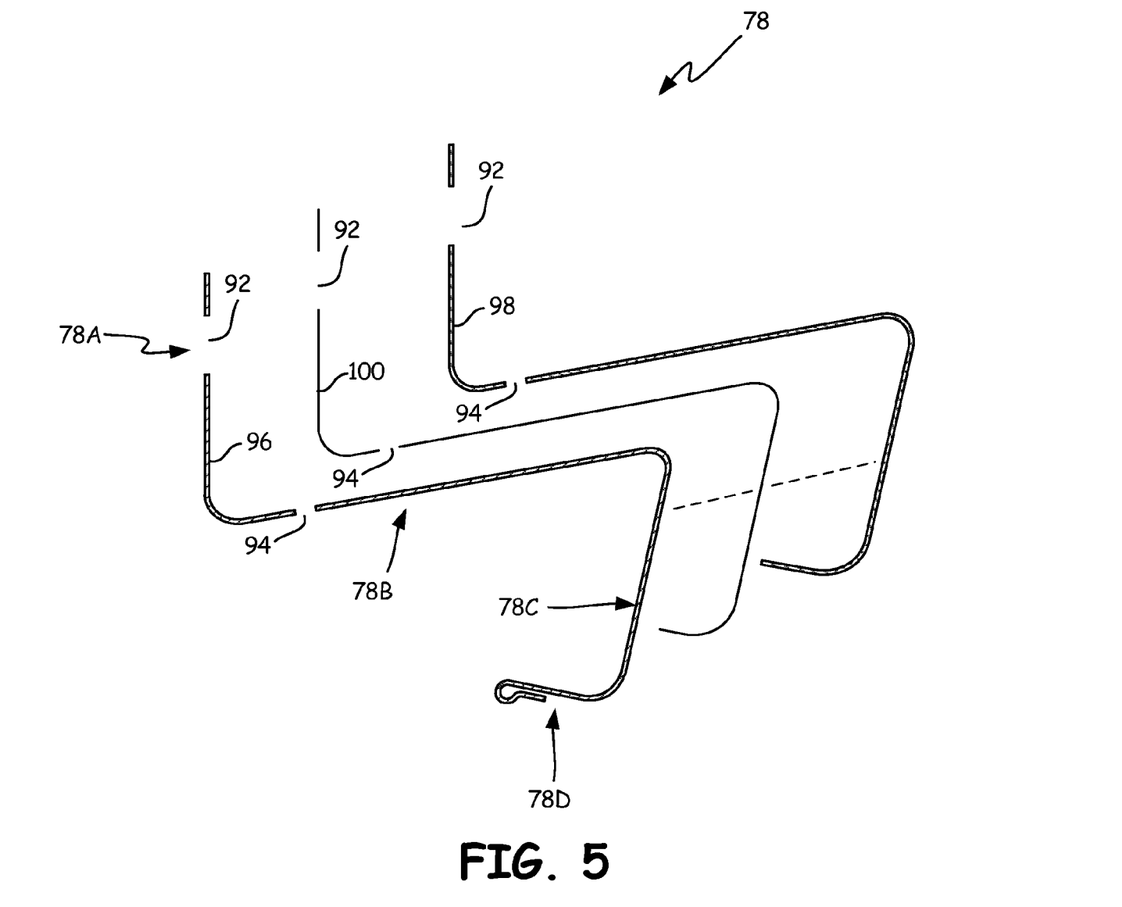
FIG. 5 is an exploded cross-sectional view of the finger seal of FIG. 4.

Annular cavities in and around first module 42 and second module 44 can be sealed against intrusion of combustion or gases from main gas flow path 51. One such cavity is annular cavity 74 disposed at an outer diameter (OD) location proximate the joint between first module 42 and second module 44. In the illustrated embodiment, seal assembly 76 is disposed proximate annular cavity 74, and includes finger seal 78. FIG. 3 illustrates annular cavity 74 and surrounding components in greater detail, while FIGS. 4 and 5 are directed towards finger seal 78. Finger seal 78 controls flow leakage between first outer casing 54 and fairing outer platform 62, while directing limited airflow through cooling holes to discourage airflow away from annular cavity 74 and from a radial face of finger seal 78.

FIG. 3 is a close-up cross-sectional view of region III of gas turbine engine 10 from FIG. 2, near joint 40. Included in region III are module fasteners 45, stator OD platform 53, first outer case 54, second outer case 56, outer fairing platform 62, strut liner 66, heat shield element 72A, annular cavity 74, finger seal 78 (comprising first section 78A, second section 78B, third section 78C, and fourth section 78D), bolt 80, seal retention ring 82, dogbone carrier 84, dogbone seal 86, protrusion 88, opening 90, fastener holes 92, and air holes 94.

As described above with respect to FIG. 2, first and second outer cases 54 and 56 are interconnected by module fastener 45. Bolt 80 secures heat shield element 72A, finger seal 78, and seal retention ring 82 to first outer case 54. Opening 90 is an annular gap formed between first turbine module 42 and second turbine module 44, and more particularly between outer fairing platform 62 and stator OD platform 53. Dogbone carrier 84 is a structure constructed into or affixed to stator OD platform 53 that supports dogbone seal 86, an air seal that limits radial flow outward from opening 90 toward downstream components. Although the depicted embodiment illustrates dogbone carrier 84 with dogbone seal 86, other embodiments of gas turbine engine 10 may utilize alternative air sealing mechanisms at or near this location.

Annular cavity 74 is bracketed and defined by second outer case 54, dogbone carrier 84, and seal retention ring 82. Seal retention ring 82 abuts and forces finger seal 78 radially downward, such that fourth section 78D of finger seal 78 contacts outer fairing platform 62. Protrusion 88 is a radially inwardly-extending portion of dogbone carrier 84 that extends radially past seal retention ring 82 and the joint of second and third sections 78B and 78C of finger seal 78.

Finger seal 78 comprises four sections, as described in greater detail below with respect to FIGS. 4 and 5. First section 78A is substantially radially oriented, and has fastener holes 92 through which bolt 80 passes to anchor finger seal 78 to first outer case 54. Second section 78B is substantially circumferentially or frustoconically oriented, and extends along the length of seal retention ring 82. Second section 78B contacts seal retention ring 82 near protrusion 88, where second section 78B meets third section 78C. Second section 78B has air holes 94 that allow cooling flow CF1 to pass through second section 78B and aft towards opening 90. Third section 78C is a substantially radial face of finger seal 78 that spans the remaining radial gap between outer fairing platform 62 and second outer case 54, and contacts both outer fairing platform 62 and seal retention ring 82. Fourth section 78D is a substantially circumferential section angled relative to the frustoconical outer surface of outer fairing platform 62, so as to capture cooling flow CF2. During operation of gas turbine engine 10, cooling flow CF1 passes through air holes 94, between finger seal 78 and seal retention ring 82, and past third section 78C, while cooling flow CF2 passes between finger seal 78 and outer fairing platform 62 and past third section 78C. Cooling flows CF1 and CF2 are limited flows; finger seal 78 allows restricted air flow between heat shield element 72 and outer fairing platform 62 towards opening 90. In addition to convectively cooling region 78C of fairing 78, which is exposed to hot combustion gasses via opening 90, cooling flows CF1 and CF2 discourage radially outward exhaust gas flow from opening 90 towards annular cavity 74. Cooling flows CF1 and CF2 cooperate to form a deflecting airflow barrier to ingested combustion gasses, thereby reducing the operating temperature of annular cavity 74, and allowing lower temperature-capable materials to be used in this region of gas turbine engine 10 without significant loss of operating lifetime. In particular, protrusion 88 cooperates with seal retention ring 88 to direct cooling flow CF1 radially inward and forward, directly opposing the ingestion path of combustion gasses 34 via opening 90. In this way, finger seal 78 both restricts fluid flow radially outward of outer fairing platform 62, and helps protect radially outward components situated near annular cavity 74 from overheating.

FIG. 4 is a perspective view of a circumferential arc of finger seal 78, illustrating first region 78A, second region 78B, third region 78C, fourth region 78D, fastener holes 92, cooling holes 94, first ply 96, second ply 98, foil layer 100, first ply keyhole slots 102, and second ply keyhole slots 104 (in phantom). FIG. 5 is a cross-sectional exploded view of the finger seal 78 through section line 5-5 of FIG. 4, illustrating the aforementioned elements with first ply 96, second ply 98, and foil layer 100 exploded apart.

First, second, third, and fourth regions 78A, 78B, 78C, and 78C of finger seal 78 are folded sections of finger seal 78, as described above with respect to FIG. 3. First and third regions 78A and 78C are substantially radially oriented, while second and fourth regions 78B and 78D are substantially circumferentially oriented. Finger seal 78 comprises first and second plies 96 and 98, and foil layer 100. First ply 96 and second ply 98 can, for example, each be folded sheet metal components. In some embodiments, first and second plies 96 and 98, respectively, can each be formed entirely from multi-segmented sheets of stamped and/or folded metal. In alternative embodiments, first and second plies 96 and 98 can be formed of a plurality of connected pieces.

First and second plies 96 and 98 are each disposed with a plurality of keyhole slots 102 and 104. Keyhole slots 102 and 104 extend through all four regions (78A, 78B, 78C, and 78D) of each ply, and can be elongate slots or slits with widened (i.e. "lollipop") ends to provide stress relief. Keyhole slots 102 and 104 allow first and second plies 96 and 98, respectively, to bend circumferentially about the diameter of seal retention ring 82 (see FIG. 3). Keyhole slots 102 are circumferentially offset from keyhole slots 104 to reduce air flow through the body of finger seal 78. Foil layer 100 is a flexible or deformable foil sheet set between first and second plies 96 and 98 to further reduce unwanted air flow through the body of finger seal 78, such that substantially the only air flow through the body of finger seal 78 is at air holes 94, which are cut to allow only limited flow so as to discourage combustion gas ingestion, as described above with respect to FIG. 3. In some embodiments, finger seal 78 is formed of a plurality of circumferentially adjacent arcs such as the arc illustrated in FIG. 4, each with circumferentially offset plies such that first and second plies 96 and 98 of adjacent arcs overlap.

The three-part construction of finger seal 78 with first ply 96, second ply 98, and foil layer 100 allows finger seal 78 to conform to the annular shape of seal retention ring 82 and outer fairing platform 62 with minimal axial leakage of secondary airflow through finger seal 78. Cooling flows CF1 and CF2 constitute substantially the only airflow through finger seal 78, and preserve radially outboard components from potentially harmful hot combustion gasses by opposing combustion gas ingestion through opening 90.

Discussion of Possible Embodiments

The following are non-exclusive descriptions of possible embodiments of the present invention.

An air seal for a gas turbine engine platform, the air seal comprising: a flow path platform; a seal retention ring situated radially adjacent the flow path platform; a finger seal retained by the seal retention ring between the flow path platform and the seal retention ring, the finger seal comprising: a first ply with first keyhole slots; a second ply with second keyhole slots circumferentially offset relative to the first keyhole slots; a foil layer disposed between the first and second plies.

The air seal of the preceding paragraph can optionally include, additionally and/or alternatively, any one or more of the following features, configurations and/or additional components:

A further embodiment of the foregoing air seal, wherein the finger seal has cooling flow holes extending through the first ply, the second ply, and the foil layer that direct airflow through the finger seal aft and towards the seal retention ring.

A further embodiment of the foregoing air seal, wherein the cooling holes are situated in a substantially circumferential region of the finger seal extending from a first substantially radial region with a plurality of bolt holes to a second substantially radial region extending from the seal retention ring to the flow path platform.

A further embodiment of the foregoing air seal, further comprising: a seal carrier immediately downstream of the seal retention ring, wherein the seal carrier and the seal retention ring cooperate to define an annular cavity, and the seal carrier has a protrusion that directs past the finger seal away from the annular cavity.

A further embodiment of the foregoing air seal, wherein the protrusion comprises a portion of the seal carrier that extends radially inward of the seal retention ring.

A further embodiment of the foregoing air seal, wherein the finger seal comprises a plurality of separate circumferential finger seal sections.

A further embodiment of the foregoing air seal, wherein the first ply and second ply each comprise a plurality of circumferentially offset first and second circumferential ply sections making up the plurality of circumferential finger seal sections.

A further embodiment of the foregoing air seal, wherein the finger seal comprises: a substantially radial first region with a plurality of bolt holes; a substantially radial second region extending from the seal retention ring to the flow path platform; a substantially circumferential third region extending aft from the first region to the second region; and a substantially circumferential fourth region extending forward from the second region, away from the flow path platform.

A further embodiment of the foregoing air seal, wherein the finger seal is an outer air seal, and the seal retention ring is disposed radially outward of the flow path platform.

A gas turbine engine section comprising: a turbine exhaust case frame with a structural case; a fairing disposed within the turbine exhaust case frame, and having a flow path platform that defines a main gas flow path through the gas turbine engine section; a finger seal disposed to restrict flow between the structural case and flow path platform, the finger seal comprising: a first ply; a second ply; and a foil layer disposed between the first and second plies.

The gas turbine engine section of the preceding paragraph can optionally include, additionally and/or alternatively, any one or more of the following features, configurations and/or additional components:

A further embodiment of the foregoing gas turbine engine section, wherein the first and second plies have first and second keyhole slots, respectively, and wherein the first keyhole slots are not aligned with the second keyhole slots.

A further embodiment of the foregoing gas turbine engine section, further comprising a seal retention ring disposed immediately radially outward of the finger seal.

A further embodiment of the foregoing gas turbine engine section, wherein the finger seal cooperates with an adjacent gas turbine section to direct airflow away from an annular cavity situated immediately radially outward of the seal retention ring.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air seal for a gas turbine engine platform, the air seal comprising:
   a flow path platform;
   a seal retention ring situated radially adjacent the flow path platform;
   a finger seal retained by the seal retention ring between the flow path platform and the seal retention ring, the finger seal comprising:
      a first ply with first keyhole slots;
      a second ply with second keyhole slots circumferentially offset relative to the first keyhole slots;
      a foil layer disposed between the first and second plies; and
      cooling flow holes extending through the first ply, the second ply, and the foil layer, and that direct airflow through the finger seal aft and towards the seal retainer ring, the cooling holes situated in a substantially circumferential region of the finger seal extending from a first substantially radial region with a plurality of bolt holes to a second substantially radial region extending form the seal retention ring to the flow path platform.

2. The air seal of claim 1, further comprising:
   a seal carrier immediately downstream of the seal retention ring, wherein the seal carrier and the seal retention ring cooperate to define an annular cavity, and the seal carrier has a protrusion that directs airflow past the finger seal, away from the annular cavity.

3. The air seal of claim 2, wherein the protrusion comprises a portion of the seal carrier that extends radially inward of the seal retention ring.

4. The air seal of claim 1, wherein the finger seal comprises a plurality of separate circumferential finger seal sections.

5. The air seal of claim 1, wherein the first ply and second ply each comprise a plurality of circumferentially offset first and second circumferential ply sections making up the plurality of circumferential finger seal sections.

6. The air seal of claim 1, wherein the finger seal comprises:
   a substantially radial first region with a plurality of bolt holes;
   a substantially radial second region extending from the seal retention ring to the flow path platform;
   a substantially circumferential third region extending aft from the first region to the second region; and
   a substantially circumferential fourth region extending forward from the second region, away from the flow path platform.

7. The air seal of claim 1, wherein the finger seal is an outer air seal, and the seal retention ring is disposed radially outward of the flow path platform.

8. A gas turbine engine section comprising:
   a turbine exhaust case frame with a structural case;
   a fairing disposed within the turbine exhaust case frame, and having a flow path platform that defines a main gas flow path through the gas turbine engine section;
   a finger seal disposed to restrict flow between the structural case and flow path platform, the finger seal comprising:
      a first ply;
      a second ply; and
      a foil layer disposed between the first and second plies; and
   a seal retention ring disposed immediately radially outward of the finger seal.

9. The gas turbine engine section of claim 8, wherein the first and second plies have first and second keyhole slots, respectively, and wherein the first keyhole slots are not aligned with the second keyhole slots.

10. The gas turbine engine of claim 8, wherein the finger seal cooperates with an adjacent gas turbine section to direct airflow away from an annular cavity situated immediately radially outward of the seal retention ring.

* * * * *